Nov. 3, 1959  C. W. CHAPMAN  2,910,844
TORSIONALLY RESILIENT COUPLINGS
Filed April 16, 1958   4 Sheets-Sheet 1
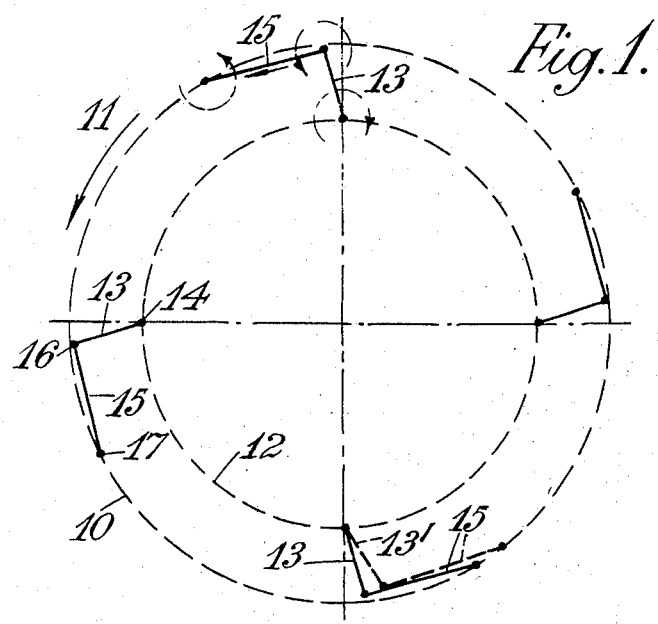
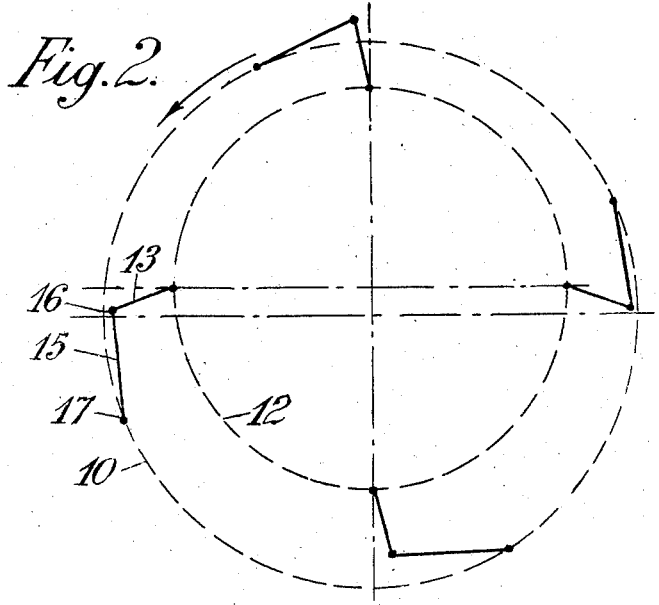
INVENTOR
Charles Wallace Chapman

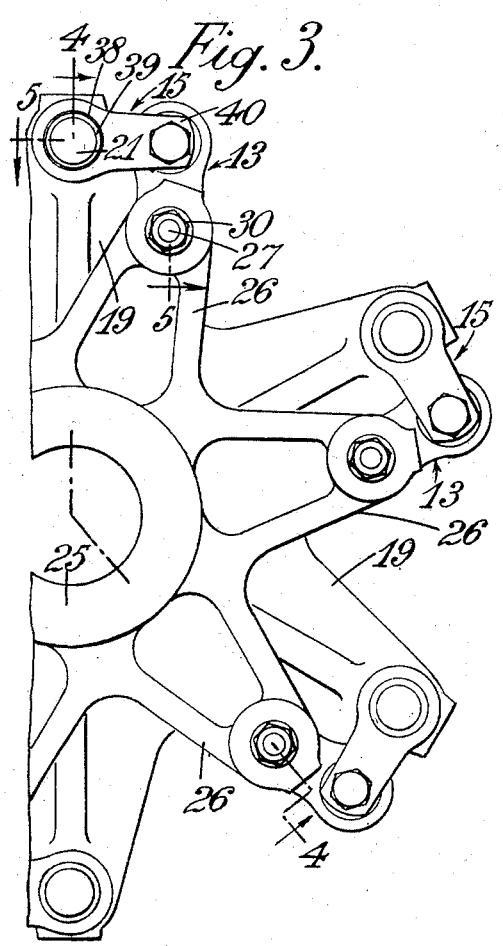
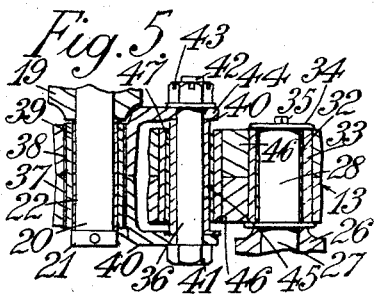
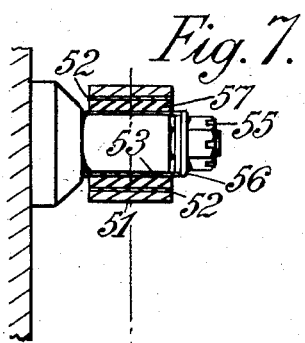
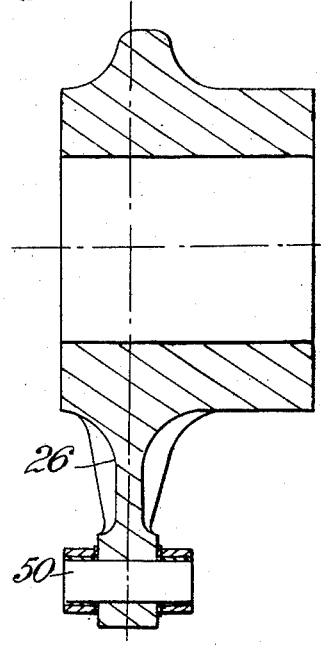
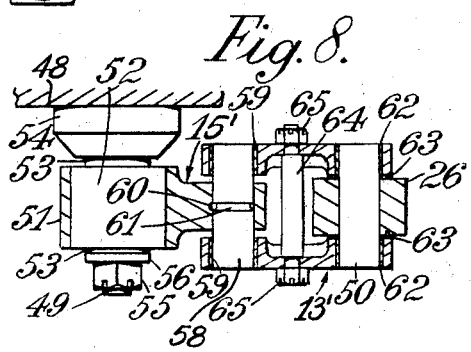
INVENTOR
Charles Wallace Chapman

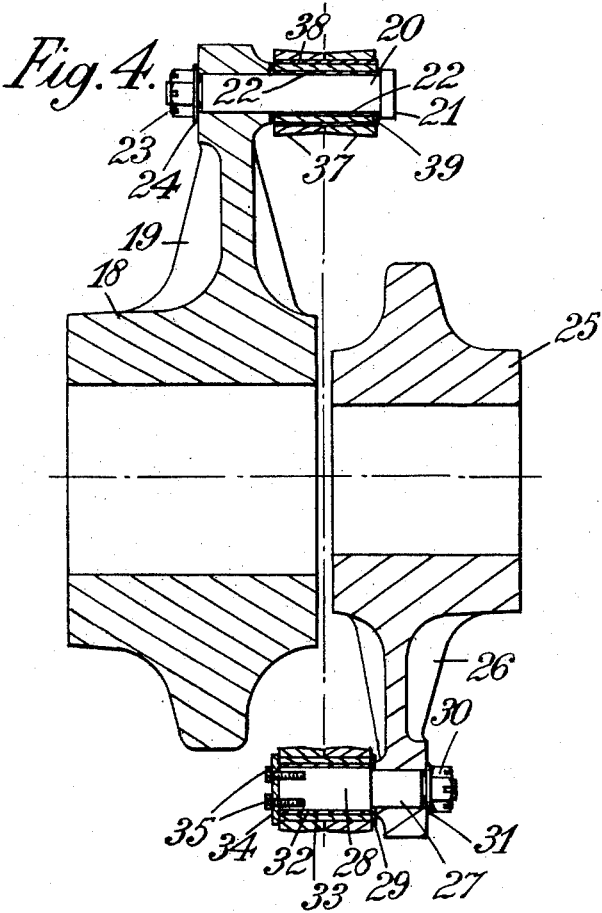

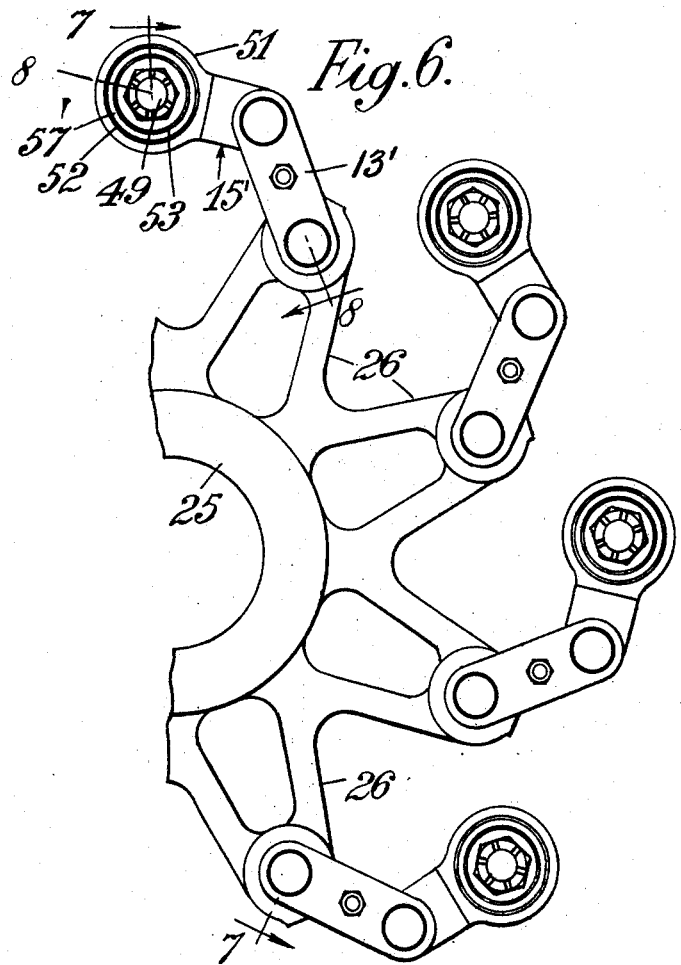

United States Patent Office 2,910,844
Patented Nov. 3, 1959

2,910,844

TORSIONALLY RESILIENT COUPLINGS

Charles Wallace Chapman, Burstow, near Horley, England, assignor to Twiflex Couplings Limited, Twickenham, England, a British company Application April 16, 1958, Serial No. 728,998

Claims priority, application Great Britain June 4, 1957

13 Claims. (Cl. 64—19)

This invention relates to torsionally resilient couplings for connecting together two normally coaxial shafts and of the kind in which driving and driven members of the coupling, attachable respectively to the two shafts, are connected to one another by a number of pairs of links, the links of each pair being pivotally connected together at one of their ends while their other ends are pivotally connected respectively to the driving and driven members of the coupling, and at least one of which pivotal connections is restrained against pivotal movement by resilient restraining means. With such an arrangement two main forces are liable to be transmitted to said resilient restraining means, a force resulting from the centrifugal force on the links, and the force resulting from the torsional load transmitted by the coupling. An object of the present invention is to prevent said resilient restraining means from being overstressed by said forces, and to provide a coupling, the effective torsional resistance of which varies with change of transmitted torque in such manner that the required degree of torsional resilience is maintained, for example, the effective torsional resistance may increase as rapidly as possible with increase of transmitted torque.

According to this invention a torsionally resilient coupling of the kind referred to above is characterised in that the pivotal connections on the driving member of the coupling are arranged at different distances from the axis of rotation of the coupling than are the pivotal connections on the driven member of the coupling, and in that said resilient restraining means, under no load conditions on the coupling, are arranged to locate in a radial or nearly radial manner those links which extend from the pivotal connections nearer said axis of rotation on one member of the coupling than are the pivotal connections between the other links and other member of the coupling.

Preferably the two links of each pair are arranged substantially at right angles to one another under no load conditions on the coupling.

Each of the aforesaid nearly radial links may be inclined to a radius in such a direction that centrifugal force tends to swing that link in the opposite direction to that resulting from the torque transmitted to that link by the other link connected to it.

It will be appreciated that the member of the coupling to which the nearly radial links are directly pivotally connected, may either be the driving or driven member. For practical considerations it is usually more convenient for it to be the driven member. Also the disposition of the links may be so chosen in relation to the direction of rotation of the coupling that said other links are either in tension or compression when a torque is being transmitted.

In the case where the driven member has the nearly radial links pivoted to it and the other links are arranged to be in tension, each said nearly radial link under torque conditions is arranged to be inclined to a radius in a leading direction with respect to the rotation of the coupling whilst in the case where the driving member has the nearly radial links pivoted to it and the other links are arranged to be in tension each said nearly radial link is inclined to a radius in a trailing direction.

To satisfy the above conditions each radial or nearly radial link of a pair preferably requires to be short as possible.

In any of the arrangements referred to above the aforesaid resilient restraining means may comprise a torsionally resilient bush associated with at least one of the pivotal connections of each pair of links so that the outside of the bush is fixed against rotation relatively to one member of the connection and the inside of the bush is fixed against rotation with respect to the other member of the connection.

As previously indicated one of the objects of the invention is to prevent such torsionally resilient pivotal connections from being overstressed. Overstressing may take place both in compression and in torsion. The makers of torsionally resilient bushes usually set out the safe rating both for compression and torsion. It will be appreciated with the above construction of coupling the two links of each pair tend to come into line with increase of torque transmitted. In designing a coupling for a required maximum torque the radial compressive force on the bushes at maximum torque can be readily determined and bushes are selected in which the rating for compression is well outside the calculated figure. It can then be determined what torsional deflection can be permitted for maximum torque in order that the torsional stress in each bush is well within the torsional rating. Thus a feature of the present invention consists in that the relative lengths of the links of each pair of links, their angular relationship to one another and the angle of inclination of each nearly radial link to a radius are so selected that at a predetermined maximum speed and/or maximum torque for which the coupling is designed the compressive and torsional stress in the bush is within the safe compressive and torsional ratings of the bush.

It follows from these considerations that the angular movement of a torsionally resilient bush should be kept low. The smallest angular movement of the links will be between the aforesaid other links and the member of the coupling to which they are connected. Thus according to a further feature of the invention a single torsionally resilient bush is provided for each pair of links and is associated with the connection between the said other link and the member of the coupling to which it is connected.

The following is a description of one embodiment of the invention reference being made to the accompanying drawings in which:

Figure 1 is a diagrammatic view of the coupling in axial direction showing the disposition of the parts when the axes of the driving and driven shafts are substantially in line;

Figure 2 is a similar view to Figure 1 showing the disposition of the parts when the axes are out of alignment;

Figure 3 is a similar view to Figure 1 of a part of a coupling showing the details of construction of one form of the invention;

Figure 4 is a section on the line 4—4 of Figure 3;

Figure 5 is a section on the line 5—5 of Figure 3 but with the links in line with one another instead of at an angle as in Figure 3;

Figures 6, 7 and 8 are similar views to those of Figures 3, 4 and 5 of an alternative construction.

Referring to the arrangement shown in Figure 1, the dotted circle 10 represents the driving part of a coupling which is rotating in the direction indicated by the arrow 11 and the dotted line 12 represents the driven part of the coupling. As will be seen the driving and driven members are connected together by four pairs of links evenly spaced apart around their circumferences. Each pair of links comprises a comparatively short link 13 pivoted at a point 14 on the driven member and pivoted to a longer link 15 at a point 16 and which longer link is pivoted at 17 to the driving member. The points 14 and 17 lie on the circles of different diameters.

Each pivotal connection 17 embodies torsionally resilient means such as torsionally resilient bushes shown in more detail in Figures 3 to 8 which are so arranged as to tend to maintain the link 13 at a small angle to the radius in a leading direction with respect to the rotation of the coupling when under no load conditions and the length of the two links 13 and 15 are so selected that when the latter is pivotally connected to the driving part of the coupling it extends approximately at right angles to the link 13 under no load conditions.

As will be gathered the link 15 is subjected to tension when transmitting a drive. Also it will be noted that the link 13 will tend to swing to a radial direction under the action of centrifugal force in opposition to the turning moment exerted upon it by the member 15 under tension in transmitting a drive.

As previously indicated the relative lengths of the links in each pair of links, their angular relationship to one another and to the driving and driven members and the angle of inclination of each nearly radial link to a radius are so selected that, at a predetermined maximum speed and/or maximum torque for which the coupling is designed, the compressive and torsional stresses in the bushes are within the safe compressive and torsional ratings of the bushes.

To satisfy the above conditions each radial or nearly radial link of each pair requires to be short as possible.

For example assuming an arrangement of resilient pivotal connections is provided as shown in Figures 3 to 8 with a coupling capable of transmitting a torque of 20,000 pound feet at the speed of 375 r.p.m. the links 13 are pivoted to the driven part of the coupling at points lying on the circle having a diameter of 32 inches and the links 15 are pivoted to the driving member at points lying on the circle of a diameter of 43 inches. The lengths of the links 13 and 15 between their pivot centres are 6 inches and 5½ inches respectively. Each of the pivotal connections may be of a known kind comprising a rubber or rubber like bush bonded between two concentric metal sleeves fixed respectively to the two parts of the pivotal connection. The outside diameter of the outer sleeve is 4½ inches and the internal diameter of the inner sleeve is 2¾ inches and the radial thickness of the rubber bush is .6 inch. The bush selected for use with a linkage as set out above has a rating such that should the links be adjusted under no load conditions so that the link 13 is truly radial then when the coupling is transmitting a torque of 20,000 pound feet at 375 r.p.m. there is no overstressing of the rubber and there is an angular deflection between the two members of the coupling of about 8°.

With such an arrangement the centrifugal force on the links 15 is resisted by radial tension in the radial or nearly radial links 13, and by radial forces at the pivots of the links. Thus little or no torsional load is transmitted to the resilient restraining means by centrifugal force. Further with such an arrangement resistance of a coupling to radial mal-alignment of one shaft to the other is a minimum since as the links in each pair are substantially at right angles to one another, radial mal-alignment is always compensated by the swinging or angular displacement of the links as indicated in Figure 2.

Moreover since one link 13 of each pair is radial or nearly radial and the other 15 approximately at right angles thereto, this latter link is approximately tangential to a circle whose centre is the centre of rotation. From this it follows that as torque is applied to the coupling it will be transmitted from one member to the other member of the coupling mainly along the tangential links tending to swing the substantially radial links 13, which swinging is resisted by centrifugal force and by the resilient restraining means.

Assuming complete rigidity in the various parts of the coupling other than the resilient pivotal connections it will be seen that when very little torque is being transmitted and the links are approximately at right angles to one another one of said members rotates comparatively freely relative to the other i.e. the torsional stiffness of the coupling is low. If on the other hand the torque transmitted is sufficiently high, the radial or nearly radial link 13 will tend to be pulled into line with the tangential link 15 and the torque will be transmitted through both links in tension so that the torsional stiffness of the coupling with complete rigidity of the various parts will be high.

The aforesaid resilient restraining means may be incorporated in any or all of said pivotal connections 14, 16 and 17, but preferably it is incorporated only in the pivotal connection 17 since for a given relative rotation between the parts 19 and 26 of the coupling there will be less angular movement between the parts of the connection 17 than in the other connections and thus there may be maximum coupling displacement without over stressing this bush. By these means a coupling of low torsional stiffness may be obtained.

As indicated above the pivotal connection incorporating said resilient restraining means may be of the known kind comprising a rubber or rubber-like bush bonded between two concentric metal sleeves fixed respectively to the two parts of the pivotal connection.

Alternatively all said pivotal connections may be free connections and at least one of them is resiliently restrained against pivoting in either direction by spring means.

The following general considerations arise in designing a coupling embodying resilient bushes arranged in the above manner and in which the inner sleeve of the bush is secured to a pin fixed to one of the coupling members so as to extend parallel to the axis of rotation, while the other sleeve is fixed to the end of a link.

(1) The angle of twist to which bushes are subjected under maximum centrifugal force should not exceed the angular movement specified by the manufacturers for safe conditions for avoiding disruption of the rubber.

(2) Likewise the angle of twist to which the bushes are subjected under maximum torque transmitted should not exceed the aforesaid angular movement specified by the maker.

(3) The radial link should be as short as possible in order to keep centrifugal force moment down.

(4) The bore of each bush should be comparatively large and the length short.

(5) At full speed when no torque is being transmitted the position of each radial link should be such that the centrifugal force moment does not exceed the maximum torsional moment that the resilient bush or bushes associated with that link will withstand.

(6) Under full torque conditions with the coupling stationary the resilient bushes should withstand the torsional load imposed upon them without over stressing them.

(7) The resilient bushes should withstand the radial load when the torque is at a predetermined maximum.

Referring to the arrangement shown in Figures 3 to 5, the driving element of the clutch comprises a hub portion 18 arranged for attachment to a driving shaft (not shown) and having a number of outwardly radiating arms 19. Fixed against rotation in the outer end of each arm 19 is a pivot pin 20 which projects to one side of the arm and is provided at that end with a head 21. A sleeve 22 is arranged between the head and one side face of the arm and the other end of the pivot pin 20 is screw threaded to receive a clamping nut 23 and washer 24 which abuts the opposite side of the arm 19 to the sleeve 22, thus by tightening the nut 23 both the pin and the sleeve 22 are fixed against rotation relatively to the arm.

The driven element of the coupling comprises a hub portion 25 arranged for attachment to a driven shaft (not shown) and which is provided with a number of outwardly radiating arms 26. The outer end of each arm is drilled to receive the smaller portion 27 of a stepped pivot pin, the larger portion 28 of which is disposed to one side of the arm and opposite the projecting portion of the pivot pin 20 carried by the driving member. A washer 29 is disposed between the shoulder formed by the stepping of the pin and the side of the arm 26 and the pivot pin is fixed against rotation in the arm 26 by a clamping nut 30 which engages a threaded extremity of the smaller portion of the pivot pin, a washer 31 being provided between the nut and the other side of the arm to the enlarged portion 28.

Pivotally mounted on the enlarged portion 28 of the pivot pin, is an anti-friction bearing 32 which is a press fit in a steel portion 33 which is retained in position by a plate 34 attached to the end face of the enlarged portion 28 of the pivot pin by screws 35. The stepped pivot pin 27, 28 corresponds to the pivot pin 14 of Figures 1 and 2 and the pivot pin 20 corresponds to the pivot pin 17. The pivot pins associated with each pair of arms 19 and 26 are connected together by links 13 and 15 which are themselves pivoted together by a pivot pin 36 corresponding to the pivot pin 16 of Figure 1. As can be seen in Figure 5, the link 15 is formed in two similar parts each of which at one end is provided with a socket portion 37 in which is fixed a steel sleeve 38 and between the steel sleeve 38 and sleeve 22 is bonded a resilient bush 39 formed from rubber or synthetic rubber. The two parts of the link provide between them fork arms 40 through which the pivot pin 36 extends and which pivot pin is provided at one end with a head 41 and at the other end with a threaded part 42 which is engaged by a nut 43, a washer 44 being provided between the nut and a side face of one of the fork arms 40. The pivot pin 36 is encircled by a sleeve 45 which is gripped between the fork arms 40 by tightening the nut 43. The link 13 is formed by two similar plates 46 which are drilled at both ends, one end encircling the sleeve 45 with an intervening anti-friction bearing 47 and the other end encircling the sleeve 33 on the enlarged portion 28 of the pivot pin carried by the arm 26. The two steel sleeves 22 and 38 and intervening rubber bush 39 are so assembled with their associated parts and the rubber bush so angularly adjusted that the links 13 and 15 take up the positions somewhat as shown in Figure 1 when no torque is being transmitted.

The coupling shown in Figures 6 to 8 is suitable for connecting an engine fly-wheel to a driven shaft. For this purpose the engine fly-wheel 48 is provided with a number of pivot pins 49 projecting from and distributed around one side face thereof. As in the arrangement last described above, the part of the coupling secured to the driven shaft comprises a hub portion 25 from which radiate a number of arms 26. Pivot pins 50 are secured in holes formed in the outer extremity of the arms 26 and project on both sides thereof instead of on one side as in the previously described construction. The pivot pins 49 and 50 are connected together by links 13' and 15' arranged in the manner described with reference to Figure 1. The link 15' is formed in a single part having an enlarged socket portion 51 in which a steel sleeve 52 is a jamming fit. A second and smaller diameter steel sleeve 53 encircles the pivot pin 49 and abuts against the shoulder formed on an enlarged part 54 of the pivot pin. A threaded extremity of the pivot pin 49 is engaged by a clamping nut 55 and a washer 56 is disposed between it and the end of the inner sleeve 53 which is fixed to the pivot pin whereas the sleeve 52 is fixed to the link 15'. A bush 57 of rubber or synthetic rubber is bonded between the two sleeves. The link 13' is duplicated and one end of each part is connected to the link 15' by a pivot pin 58 which extends through anti friction bearings 59 fixed in those ends and which pivot pin is retained in the link 15' by a pin 60 which engages a circumferential groove 61 in the pivot pin. The other ends of the two part link 13' are provided with anti-friction bearings 62 which encircle the ends of the pivot pin 50 which projects on either side of the arm 26, washer 63 being provided between the sides of the link and the sides of the arm 26. The two parts of the link 13' are clamped together by a rod 64 extending through holes in said part and is screw threaded at its ends to receive clamping nut 65.

I claim:

1. A torsionally resilient coupling comprising driving and driven members, a number of pairs of links, a pivotal connection between the links of each pair, another pivotal connection between one of the links of each pair and driving member, and a further pivotal connection between the other link and the driven member, which pivotal connections on the driving member of the coupling are arranged at different distances from the axis of rotation of the coupling than are the pivotal connections on the driven member, and wherein at least one of the pivotal connections associated with each pair of links embodies a torsionally resilient bush the outside of which bush is fixed against rotation relatively to one member of the connection and the inside of the bush is fixed against rotation relatively to the other member of the connection which bush under no load conditions on the coupling locates in a radial or nearly radial position that link which extends from a pivotal connection nearer the axis of rotation of the coupling.

2. A torsionally resilient coupling according to claim 1 wherein all the pivotal connections embody resilient bushes, the outside of each bush being fixed to one of the parts of the connection and the inside of the bush to the other part of the connection.

3. A torsionally resilient coupling according to claim 1 wherein the pivotal connections nearest the axis of rotation of the coupling are arranged on the driving member and wherein the links extending outwardly therefrom are inclined to radii in trailing directions with respect to the direction of rotation of the coupling and the links pivoted to the outer extremities of the inclined links extend therefrom also in a trailing direction, whereby both the transmission of torque and the centrifugal action on the links inclined to the radii place the other links in tension.

4. A torsionally resilient coupling according to claim 1 wherein the pivotal connections nearest the axis of rotation of the coupling are arranged on the driven member and wherein the links extending outwardly therefrom are inclined to radii in leading directions with respect to the direction of rotation of the coupling and the links pivoted to the outer extremities of the first said links extend therefrom also in a leading direction to the pivotal connections on the driving member, whereby both the transmission of torque and the action of centrifugal force on the inclined links subject the other links to tension.

5. A torsionally resilient coupling according to claim 1 wherein the pivotal connections nearest the axis of rotation of the coupling are arranged on the driving member and the links extending outwardly therefrom are inclined to radii in leading directions with respect to the direction of rotation of the coupling and the links pivoted to the outer extremities of the first said links extend therefrom also in a leading direction whereby the latter links are placed in compression by forces generated by the transmission of the torque which is partly balanced by the action of centrifugal force on the inclined links.

6. A torsionally resilient coupling according to claim 1 wherein the pivotal connections nearest the axis of rotation of the coupling are arranged on the driven member and wherein the links extending outwardly therefrom are inclined in trailing directions with respect to the direction of rotation of the coupling and the links pivoted to the outer extremities of the inclined links extend therefrom also in a trailing direction whereby the transmission of torque placed the latter links in compression which is partly balanced by the action of centrifugal force on the links inclined to the radii.

7. A torsionally resilient coupling according to claim 1 wherein the pivotal connections nearest the axis of rotation of the coupling are arranged on the driving member and wherein the links extending outwardly therefrom are inclined in leading directions with respect to the direction of rotation of the coupling and the links pivoted to the outer extremities of the inclined links extend therefrom in a trailing direction whereby the transmission of torque places the trailing links in tension which is partly balanced by the action of centrifugal force on the inclined links.

8. A torsionally resilient coupling according to claim 1 wherein the pivotal connections nearest the axis of rotation of the coupling are arranged on the driven member and wherein the links extending outwardly therefrom are inclined in a trailing direction with respect to the direction of rotation of the coupling and the links pivoted to the outer extremities of the inclined links extend therefrom in leading directions whereby the transmission of torque subject the leading links to tension which is partly balanced by the action of centrifugal force on the inclined links.

9. A torsionally resilient coupling according to claim 1 wherein the pivotal connections nearest the axis of rotation of the coupling are on the driving member and wherein the links extending outwardly therefrom are inclined in a trailing direction with respect to the direction of rotation of the coupling and the links pivotally connected to the outer extremities of the inclined links extend in a leading direction whereby both the transmission or torque and the action of centrifugal force on the inclined links subject the other links to compression.

10. A torsionally resilient coupling according to claim 1 wherein the pivotal connections nearest the axis of rotation of the coupling are arranged on the driven member and the links extending outwardly therefrom are inclined to radii in a leading direction with respect to the direction of rotation of the coupling and the links pivoted to the outer extremities of the first said links extend therefrom in a trailing direction to the connections on the driving member whereby both the transmission of torque and the action of centrifugal force on the inclined links subject the other links to compression.

11. A torsionally resilient coupling according to claim 1, wherein the two links of each pair are arranged substantially at right angles to one another under no load conditions on the coupling.

12. A torsionally resilient coupling according to claim 1 wherein the lengths of the links in each pair of links, their angular relationship to one another and the angle of inclination of each nearly radial link to a radius is so selected that at a predetermined maximum speed and/or maximum torque for which the coupling is designed the compressive and torsional stress in the bush is within the safe compressive and torsional ratings of the bush.

13. A torsionally resilient coupling according to claim 1 wherein a single torsionally resilient bush is provided for each pair of links and is associated with the pivotal connection on that member of the coupling which has its pivotal connections further from the axis of rotation of the coupling.

References Cited in the file of this patent
UNITED STATES PATENTS

| | | |
|---|---|---|
| 2,055,951 | Strandgren | Sept. 29, 1936 |
| 2,653,457 | Guernsey et al. | Sept. 29, 1953 |
| 2,837,901 | Chapman | June 10, 1958 |